United States Patent
Thoreau et al.

(10) Patent No.: US 8,442,335 B2
(45) Date of Patent: May 14, 2013

(54) METHOD FOR MODIFYING A REFERENCE BLOCK OF A REFERENCE IMAGE, METHOD FOR ENCODING OR DECODING A BLOCK OF AN IMAGE BY HELP OF A REFERENCE BLOCK AND DEVICE THEREFORE AND STORAGE MEDIUM OR SIGNAL CARRYING A BLOCK ENCODED BY HELP OF A MODIFIED REFERENCE BLOCK

(75) Inventors: Dominique Thoreau, Cesson Sevigné (FR); Aurélie Martin, Paris (FR); Edouard Francois, Bourg des Comptes (FR); Jérôme Vieron, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 135 days.

(21) Appl. No.: 12/737,707

(22) PCT Filed: Aug. 7, 2009

(86) PCT No.: PCT/EP2009/060283
§ 371 (c)(1),
(2), (4) Date: Feb. 9, 2011

(87) PCT Pub. No.: WO2010/018137
PCT Pub. Date: Feb. 18, 2010

(65) Prior Publication Data
US 2011/0135211 A1 Jun. 9, 2011

(30) Foreign Application Priority Data
Aug. 13, 2008 (EP) .................... 08305471

(51) Int. Cl.
*G06K 9/46* (2006.01)
(52) U.S. Cl.
USPC ........... 382/238; 382/232; 382/233; 382/236; 382/248; 382/250
(58) Field of Classification Search .................. 382/232, 382/233, 236, 248, 250, 251; 348/409.1, 348/410.1, 412.1, 413.1, 416.1; 358/426.11; 375/240.16
See application file for complete search history.

(56) References Cited

U.S. PATENT DOCUMENTS

2005/0281334 A1* 12/2005 Walker et al. ............. 375/240.16
2008/0260278 A1* 10/2008 Zuo et al. ...................... 382/251
2009/0252229 A1* 10/2009 Cieplinski ................ 375/240.16

OTHER PUBLICATIONS

Boyce, "Weighted Prediction in the h.264/MPEG AVC Video Coding Standard", Circuits and Systems, 2004, ISCAS '04, Proceedings of the 2004 International Symposium on Vancouver, BC, Canada, May 23-26, 2004, pp. III-789.

(Continued)

*Primary Examiner* — Ali Bayat
(74) *Attorney, Agent, or Firm* — Myers Wolin, LLC

(57) ABSTRACT

A method for modifying a reference block of a reference image, the method includes transforming the reference block into a first set of coefficients, modifying the first set of coefficients by help of one or more weights and inverse transforming the modified first set of coefficients wherein the weights are determined by help of one or more further pixels of the current image and by help of one or more further reference pixels of the reference image.

8 Claims, 2 Drawing Sheets

OTHER PUBLICATIONS

Figure 1:
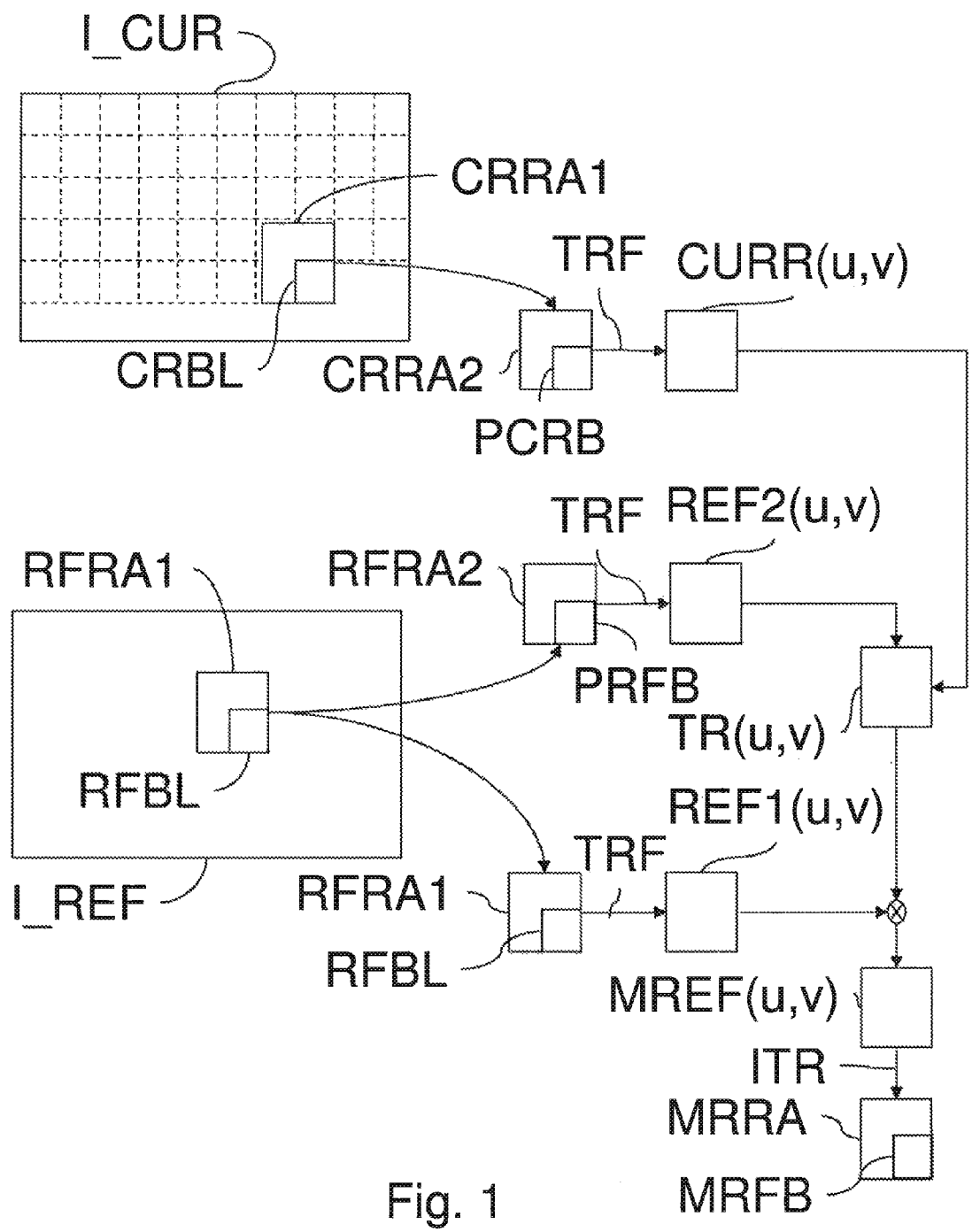

Kato et al., "Weighting Factor Determination Algorithm in H.264/MPEG-4 AVC Weighted Prediction", 2004 IEEE 6th Workshop on Multimedia Signal Processing, 2004 Institute of Electrical and Electronics Engineers, Inc., US, 2204, pp. 27-30.

Koc et al., "DCT-Based Motion Estimation", IEEE Transactions on Image Processing, vol. 7, No. 7, Jul. 1, 1998.

Koc et al., "Interpolation-Frree Subpixel Motion Estimation Techniques in DCT Domain", IEEE Transactions on Circuits and Systems or Video Technology, Aug. 1, 1998, pp. 467-468.

Panusopone et al., "An Efficient Implementation of Motion Estimation with Weight Prediction for ITU-T H.264 MPEG-4 AVC", IEEE Transactions on Consumer Electronics, vol. 53, No. 3, Aug. 2007, pp. 974-978.

Catalin-Dumitru et al., "Performance Evaluation of Motion Estimation in DCT Transform Domain", WSEAS Transactions on Signal Processing, vol. 4, No. 6, Jun. 1, 2008, pp. 372-374.

Search Report Dated Sep. 11, 2009.

* cited by examiner

| Q | A | B | C | D |
|---|---|---|---|---|
| i | 1 | 2 | 3 | 4 |
| ii | 5 | 6 | 7 | 8 |
| iii | 9 | 10 | 11 | 12 |
| iv | 13 | 14 | 15 | 16 |
PCRB, PRFB
Fig. 2
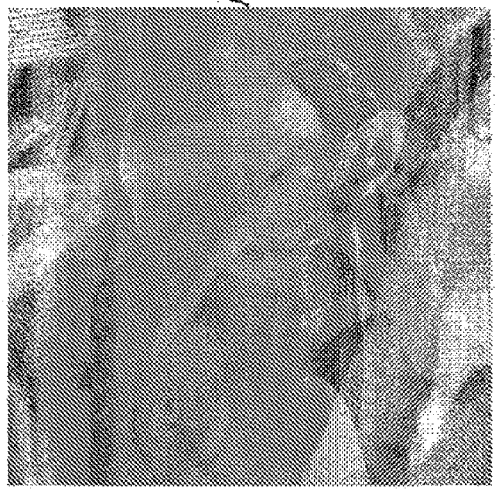
I_REF
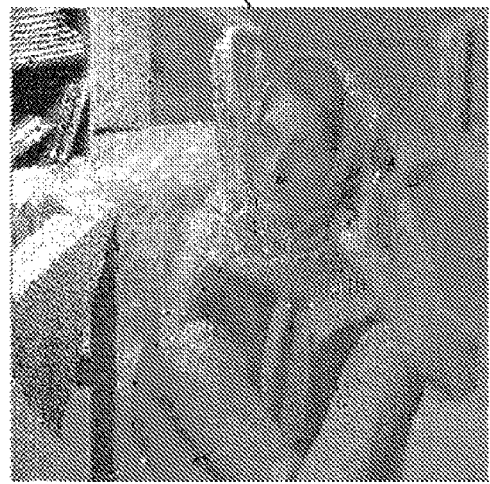
I_MRF
Fig. 3

METHOD FOR MODIFYING A REFERENCE BLOCK OF A REFERENCE IMAGE, METHOD FOR ENCODING OR DECODING A BLOCK OF AN IMAGE BY HELP OF A REFERENCE BLOCK AND DEVICE THEREFORE AND STORAGE MEDIUM OR SIGNAL CARRYING A BLOCK ENCODED BY HELP OF A MODIFIED REFERENCE BLOCK

BACKGROUND

The invention is related to a method for modifying a reference block of a reference image. The invention is further related to a method for encoding or decoding a block of an image by help of a modified reference block and to a corresponding device. And, the invention is related to a storage medium or a signal carrying a block encoded by help of a modified reference block.

In image sequences comprising cross-fading images and un-faded images, inter-prediction of one of said cross-fading images by help of one of un-faded images and vice versa is difficult. This is because the un-faded images significantly differ from the cross-fading images. Therefore, encoding a residual between one of said cross-fading images and one of the un-faded images requires a high bit rate.

The H.264-AVC video coding standard proposes modifying reference images by weighting them and forming a prediction as a sum of two or more such weighted different reference images. If one of the reference images comprises cross-fading then the corresponding weight may be negative.

The H.264-AVC video coding standard does not specify how the weights shall be determined. Therefore, the weights have to be transmitted as side information.

There is a need for reference image modification method and device which helps to improve encoding efficiency in case of cross-fading.

This application claims the benefit, under 35 U.S.C. §365 of International Application PCT/EP2009/060283, filed Aug. 7, 2009, which was published in accordance with PCT Article 21(2) on Feb. 18, 2010 in English and which claims the benefit of European patent application No. 08305471.8, filed Aug. 13, 2008.

INVENTION

This is achieved by a method for modifying a reference block of reference pixels of a reference image wherein said modified reference block is dedicated for predicting a block of pixels of a current image and said method comprises the features of claim 1.

That is, the method comprises transforming the reference block into a first set of coefficients, modifying the first set of coefficients by help of one or more weights and inverse transforming the modified first set of coefficients wherein said weights are determined by help of one or more further pixels of the current image and by help of one or more further reference pixels of the reference image.

Using further pixels of the current image as well as further reference pixels of the reference image allows the spectral weights to be determined such that they reflect a fading effect. Especially, if the reference frame is the result of a cross-fading of two or more frames of which one shall be predicted by help of the cross-fade reference frame, then, weighting in the spectral domain allows for separating the relevant of the mixed frames.

In a further embodiment of said method, said block is predicted by help of said further pixels, said reference block is predicted by help of said further reference pixels and said predicted block and said predicted reference block are further used for determining said weights.

In yet a further embodiment of said method, said predicted reference block is transformed together with said further reference pixels into a second set of coefficients, said predicted block is transformed together with said further pixels into a third set of coefficients and the weights are determined by help of said second set of coefficients and said third set of coefficients.

Said yet a further embodiment of the method may also comprise testing for a coefficient of the second set whether it exceeds a threshold and testing for the corresponding coefficient of the third set whether it exceeds the threshold, also. If at least one of the tested coefficients does not exceed the threshold, a corresponding weight is determined as being zero. Otherwise, the corresponding weight is determined as the quotient of the coefficient from the second set divided by said corresponding coefficient of the third set.

The invention is also related to a method for encoding or decoding a block of an image by help of a reference block of a reference image. Said method comprises modifying the reference block according to one of the embodiments of the method for modifying a reference block of a reference image and using said modified reference block as a prediction of the block for encoding or decoding said block.

This especially allows for decoding of a block predicted by help of a cross-fade block without requiring cross-fading specific side information.

The invention is further related to a device for encoding or decoding an image by help of a modified reference image.

Said device comprises means for transforming a reference block of the reference image into a first set of coefficients, means for determining one or more weights, means for weighting the coefficients of the first set by help of said weights and means for inverse transforming the weighted first set of coefficients wherein said weights are determined by help of one or more further pixels of the current image and by help of one or more further reference pixels of the reference image.

In a further embodiment of said device said means for determining weights are adapted for predicting said block by help of said further pixels, for predicting said reference block by help of said further reference pixels and for further using said predicted block and said predicted reference block for determining said weights.

There is yet a further embodiment of the device wherein said means for transforming are further adapted for transforming said predicted reference block together with said further reference pixels into a second set of coefficients, said means for transforming are further adapted for transforming said predicted block together with said further pixels into a third set of coefficients and said means for transforming are further adapted for determining the weights by help of said second set of coefficients and said third set of coefficients.

Said yet a further embodiment of the device may further comprise means for testing whether a coefficient of the second set exceeds a threshold and for testing whether the corresponding coefficient of the third set exceeds the threshold, also, and means for assigning a value to a corresponding weight. Said value is zero, if at least one of the tested coefficients does not exceed the threshold. And, said value is proportional to the quotient of the coefficient from the second set divided by said corresponding coefficient of the third set, otherwise.

The number of weights determined may correspond to the number of coefficients in the first set.

And, said reference block may be transformed together with said further reference pixels.

The more, the invention is as well related to a signal or storage medium carrying an encoded block of an image, said block being encoded according to said method for encoding or decoding a block of an image by help of a reference block of a reference image.

DRAWINGS

Exemplary embodiments of the invention are illustrated in the drawings and are explained in more detail in the following description.

In the figures:

FIG. 1 depicts an exemplary synopsis of the method for modifying a reference block, FIG. 2 depicts an exemplary embodiment of intermediate prediction of a reference block or a current block and FIG. 3 depicts an exemplary cross-fading image and one of the two faded images as reconstructed by help of an exemplary embodiment of the inventive method for modifying a reference block.

EXEMPLARY EMBODIMENTS

FIG. 1 depicts an exemplary synopsis of the method for modifying a reference block.

A reference area RFRA1 of n*m pixels in a reference image I_REF comprises a reference block RFBL as well as further reference pixels of the reference image I_REF. The reference area RFRA1—comprising, for instance, several reference blocks—is transformed by transformation TRF into a first set of coefficients REF1($u,v$), u=0 ... n−1, v=0 ... m−1. Said first set of coefficients REF1($u,v$) is then weighted by one or more weights TR(u,v). The transformation TRF may be a discrete cosine transformation, a wavelet transformation or any other spectral transformation. Preferably, each coefficient is individually weighted, i.e. there is one weight per coefficient which allows for maximum weighting flexibility. But a common weight for two or more coefficients may be advantageous if the computational effort shall be limited.

For determining said weights TR(u,v), a reference prediction PRFB of the reference block RFBL is generated by help of the further reference pixels comprised in the reference area RFRA1. Then, a virtual reference area RFRA2 comprising the reference prediction PRFB and the further reference pixels is formed. That is, the virtual reference area RFRA2 differs from the reference area RFRA1 in that the reference block RFBL is replaced by said reference prediction PRFB. The virtual reference area RFRA2 is transformed by the same transformation TRF as applied to the reference area RFRA1. This yields a second set of coefficients REF2($u,v$) u=0 ... n−1, v=0 ... m−1.

Determining the weights further comprises generating a current prediction PCRB of a current block CRBL comprised in a current image I_CUR wherein said current block CRBL shall be inter-coded by help of said reference image I_REF. The current prediction PCRB is formed by help of further current pixels comprised in a current area CRRA1 which further comprises said current prediction PCRB and which is comprised in the current image I_CUR. Said current prediction PCRB is formed from said further pixels the very same way by which said reference prediction PRFB is formed from said further reference pixels. The current area CRRA1 corresponds to the second reference area RFRA2 in vertical and horizontal extension.

Then, a virtual current area CRRA2 comprising the current prediction PCRB and the further current pixels is formed. That is, the virtual current area CRRA2 differs from the current area CRRA1 in that the current block CRBL is replaced by said current prediction PCRB. The virtual current area CRRA2 is transformed by the same transformation TRF as applied to the reference area RFRA1 and to the virtual reference area RFRA2. This yields a third set of coefficients CURR(u,v) u=0 ... n−1, v=0 ... m−1.

By help of the second set of coefficients and the third set of coefficients a set of weights TR(u,v) is determined. Preferably, the weights TR(u,v) are determined as for u=0 ... n−1, v=0 ... m−1:

$$TR(u, v) = \begin{cases} \dfrac{REF2(u, v)}{CURR(u, v)} & \text{if } REF2(u, v) > thrf \text{ and } CURR(u, v) > thcr \\ 0 & \text{else.} \end{cases} \quad (1)$$

wherein thrf and thcr are freely selectable thresholds, preferably set to 1.

Preferably, for each coefficient in the first set REF1($u,v$) there is a corresponding weight in the set of weights TR(u,v). Then, a set of modified coefficients MREF(u,v) is formed by multiplying each coefficient in the first set REF1($u,v$) with its corresponding weight for u=0 ... n−1 and v=0 ... m−1:

$$MREF(u,v) = REF1(u,v) * TR(u,v) \quad (2)$$

Said set of modified coefficients MREF(u,v) is inverse transformed ITR into a modified reference area MRRA of modified reference pixels.

The modified reference area MRRA of modified reference pixels comprises a modified reference block MRFB of modified pixels which is located in the modified reference area MRRA at a relative position which corresponds to the relative position of the reference block in the reference area RFRA. The relative position of the block of modified pixels in the modified reference area MRRA also corresponds to the relative position of the reference prediction PRFB in the virtual reference area RFRA2.

Said modified reference block MRFB is then used as a prediction in the context of inter-coding of said current block CRBL.

That is, the modified reference block MRFB is preferably determined the same way in an encoder for inter-coding of said current block CRBL and in a decoder for decoding the inter-coded block again.

To allow this it is necessary, that the further current pixels used for determining the weights TR(u,v) are already decoded when the current block CRBL is decoded. In a serial decoding from the upper left vertex to the lower right vertex of the image, the block to the left of the current block, the upper left block and the block to the right boundary are already decoded and the lower boundary of the current block CRBL coincides with right boundary respectively the lower boundary of the current area CRRA1 as depicted in FIG. 1.

Consider a sample as a single pixel, as a function of two or more pixels in a column, in a row or in a rectangular. Useful functions are average or mean which further may be weighted. Then, the current prediction PCRB and the reference prediction PRFB may be determined by help of samples of the current image I_CUR or the reference image I_REF, respectively, wherein the samples are adjacent to the upper boundary or to the left boundary of the current block, respectively the reference block.

Said adjacent samples may be averaged and the resulting mean may be assigned to all the pixels in the current prediction PCRB respectively in the reference prediction PRFB.

Or, a pixel in the current predictions PCRB is determined as the average of the one of the adjacent samples which is located in the same column as the pixel to-be-determined and the one of the adjacent samples which is located in the same row as the pixel to-be-determined.

The concept of prediction is depicted in FIG. 2. For instance, pixel 11 is determined as the average of sample C and sample iii wherein both samples may be determined by averaging over two or more pixels in the corresponding row, if the sample is adjacent to the left boundary of the block, or by averaging over two or more pixels in the corresponding column, if the sample is adjacent to the upper boundary of the block. Similarly, pixel 8 is determined as the average of sample D and sample ii and pixel 2 is determined as the average of sample B and sample i. In an embodiment, pixel 1 is not determined by help of samples A and I but sample Q, which may be formed from an rectangular of pixels of a block on the upper left of the current block CRBL is also taken into account.

The invention is especially useful if a cross-fading image is used as a reference for one of two or more images which are cross-faded. This is exemplarily depicted in FIG. 3. The right image is a modified reference image generated from the exemplary cross-fading of two images on the left by help of the inventive weighting in the spectral domain.

The invention claimed is:

1. A method for modifying a reference block of reference pixels of a reference image, said modified reference block is dedicated for predicting a block of pixels of a current image, said method comprises:
   transforming the reference block into a first set of coefficients,
   modifying the first set of coefficients by help of one or more weights and
   inverse transforming the modified first set of coefficients, wherein
   said block is predicted by help of further pixels of the current image,
   said reference block is predicted by help of further reference pixels of the reference image,
   said predicted reference block is transformed together with said further reference pixels into a second set of coefficients,
   said predicted block is transformed together with said further pixels into a third set of coefficients and
   the weights are determined by help of said second set of coefficients and said third set of coefficients, said method further comprising:
   testing for a coefficient of the second set whether it exceeds a first threshold and testing for the corresponding coefficient of the third set whether it exceeds a same or different third threshold,
   if at least one of the tested coefficients does not exceed the corresponding threshold, determining a corresponding weight as being zero,
   and otherwise, determining the corresponding weight as the quotient of the coefficient from the second set divided by said corresponding coefficient of the third set.

2. A method for encoding or decoding a block of an image by help of a reference block of a reference image, said method comprises:
   modifying the reference block according to claim 1, and
   using said modified reference block as a prediction of the block for encoding or decoding said block.

3. A device for encoding or decoding an image by help of a reference image, comprising:
   means for transforming a reference area comprising a reference block of the reference image into a first set of coefficients,
   means for determining one or more weights,
   means for weighting the coefficients of the first set by help of said weights and
   means for inverse transforming the weighted first set of coefficients into a modified reference area comprising a modified reference block used for encoding or decoding, wherein
   said means for determining weights are adapted to:
      predict said block by help of further pixels of the current image,
      predict said reference block by help of further reference pixels of the reference image and
      further use said predicted block and said predicted reference block for determining said weights,
   said means for transforming are further adapted for transforming said predicted reference block together with said further reference pixels into a second set of coefficients,
   said means for transforming are further adapted for transforming said predicted block together with said further pixels into a third set of coefficients, said device further comprising:
   means for testing whether a coefficient of the second set exceeds a first threshold and for testing whether the corresponding coefficient of the third set exceeds a same or different second threshold, and
   means for assigning a value to a corresponding weight wherein said value is zero, if at least one of the tested coefficients does not exceed the corresponding threshold,
   wherein said value is proportional to the quotient of the coefficient from the second set divided by said corresponding coefficient of the third set, otherwise.

4. The device according to claim 3, wherein the number of weights corresponds to the number of coefficients in the first set.

5. The device according to claim 3, wherein said reference block is transformed together with said further reference pixels.

6. A non-transitory storage medium carrying instruction of an encoded block of an image, said block being encoded according to a method for encoding a block of an image by help of a reference block of reference image, said method comprising:
   transforming the reference block into a first set of coefficients,
   modifying the first set of coefficients by help of one or more weights and
   inverse transforming the modified first set of coefficients, wherein
   said block is predicted by help of further pixels of the current image,
   said reference block is predicted by help of further reference pixels of the reference image,
   said predicted reference block is transformed together with said further reference pixels into a second set of coefficients,
   said predicted block is transformed together with said further pixels into a third set of coefficients and
   the weights are determined by help of said second set of coefficients and said third set of coefficients, said method further comprising:

testing for a coefficient of the second set whether it exceeds a first threshold and testing for the corresponding coefficient of the third set whether it exceeds a same or different third threshold, if at least one of the tested coefficients does not exceed the corresponding threshold, determining a corresponding weight as being zero, and otherwise, determining the corresponding weight as the quotient of the coefficient from the second set divided by said corresponding coefficient of the third set, and using said modified reference block as a prediction of the block for encoding or decoding said block.

7. The method according to claim 1, wherein the number of weights corresponds to the number of coefficients in the first set.

8. The method according to claim 1, wherein said reference block is transformed together with said further reference pixels.

* * * * *